P. GIBA.
VEHICLE BRAKE.
APPLICATION FILED AUG. 9, 1916.
1,204,267.
Patented Nov. 7, 1916.
2 SHEETS—SHEET 1.
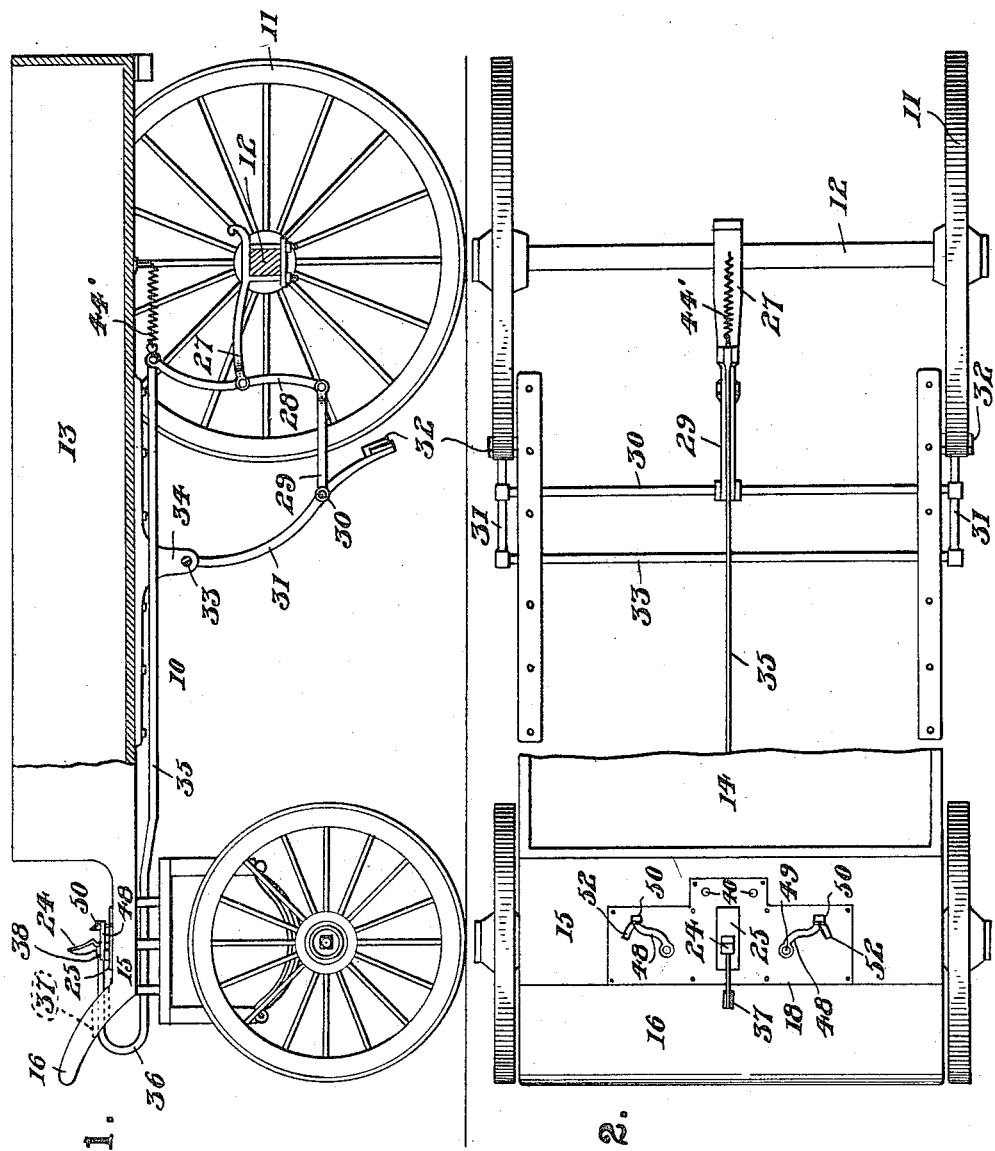
Inventor
P. Giba
By A. M. Wilson
Attorney

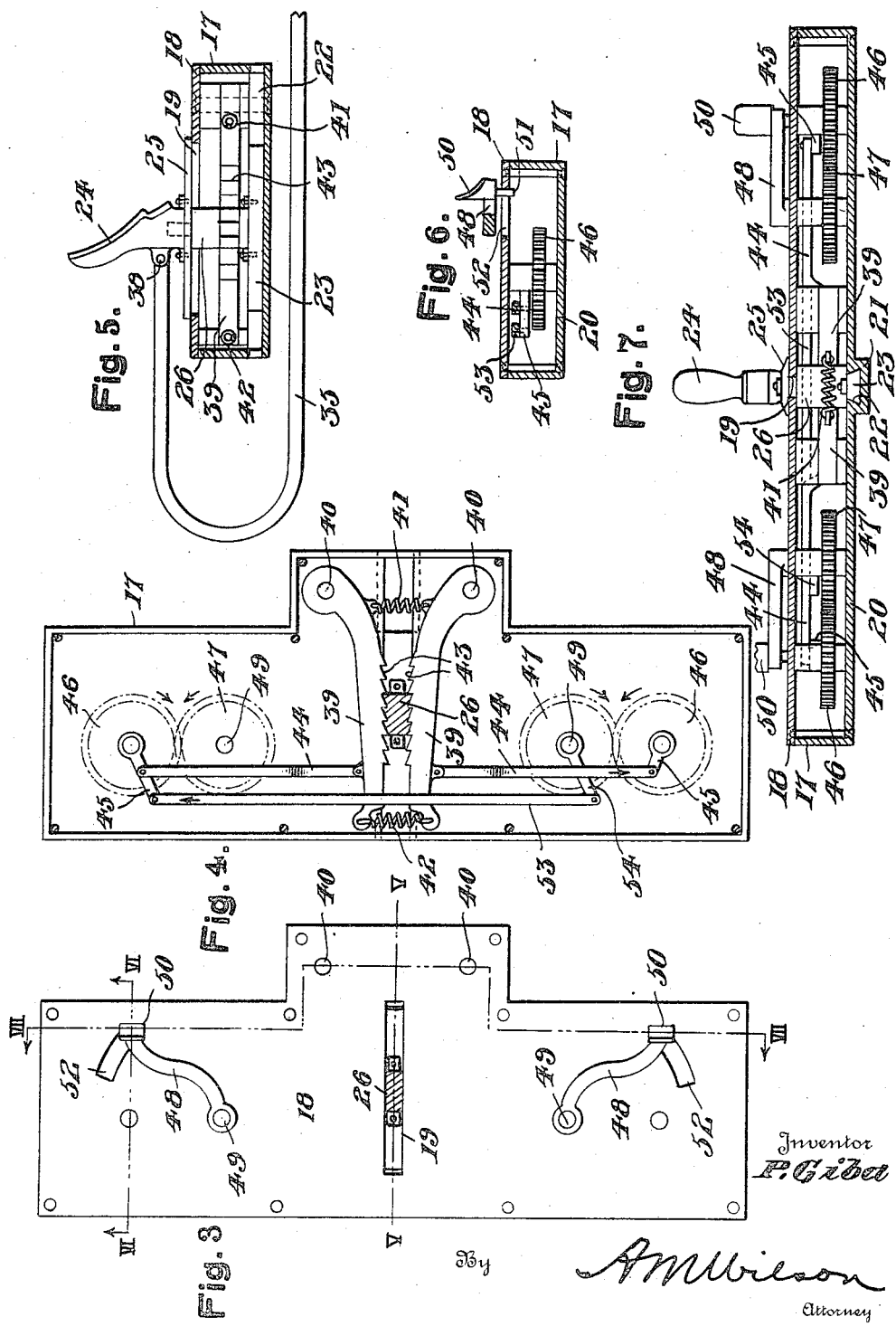

UNITED STATES PATENT OFFICE.

PIOTR GIBA, OF CHICAGO, ILLINOIS.

VEHICLE-BRAKE.

1,204,267.

Specification of Letters Patent.

Patented Nov. 7, 1916.

Application filed August 9, 1916. Serial No. 113,945.

*To all whom it may concern:*

Be it known that I, PIOTR GIBA, a subject of the Emperor of Austria-Hungary, residing at Chicago, in the county of Cook and State of Illinois, have invented certain new and useful Improvements in Vehicle-Brakes, of which the following is a specification.

This invention relates to certain new and useful improvements in vehicle brakes.

The primary object of the invention is the provision of a brake especially adapted for wagons and similar vehicles readily operable from the driver's seat whereby bearing members are frictionally contacted with the wheels of the vehicle and retained in position until manually released.

A still further object of the device is to provide a brake operating means actuated from a point centrally of the floor of the forward end of a vehicle whereby the brakes may be readily set when desired, manual releasing means being positioned at opposite sides thereof for readily releasing the brakes by means of either foot of the driver.

In the drawings forming a part of this application and in which like designating characters refer to corresponding parts throughout the several views: Figure 1 is a side elevation of a wagon partially broken away provided with the present device. Fig. 2 is a top plan view thereof. Fig. 3 is an enlarged top plan view of the floor plate of the mechanism casing. Fig. 4 is a view similar to Fig. 3 with the cover plate removed showing the brake releasing mechanism. Fig. 5 is a vertical transverse sectional view taken upon the line V—V of Fig. 3. Fig. 6 is a similar view taken upon the line VI—VI of Fig. 3, and, Fig. 7 is a vertical longitudinal sectional view taken upon line VII—VII of Fig. 3.

The present form of brake is applicable to any wheeled vehicle and is herein illustrated in connection with a wagon 10 having rear ground wheels 11 journaled upon the opposite ends of the rear axle 12 beneath the wagon box 13 while a driver's seat 14 is arranged at the forward end of the vehicle having a floor 15 and dash board 16.

A casing 17 adapted for the reception of a brake releasing mechanism hereinafter set forth is secured beneath the floor 15 centrally thereof being provided with a cover plate 18 provided with a transverse slot 19. The bottom 20 of the casing 17 is provided with a transverse depression 21 having a guide-way 22 therein adapted for the sliding reception of a block 23. A foot lever 24 is arranged upon a plate 25 slidably positioned over the slot 19 and attached to a connecting member 26 arranged within the casing 17 and secured to the block 23.

A bracket 27 is secured to the rear axle 12 having a lever 28 pivoted to its forward end, the lower end of the said lever being pivotally connected by a link 29 with a cross rod 30 connecting together oppositely positioned depending brake levers 31 having bearing blocks 32 upon their lower free ends arranged adjacent the rear wheels 11. The upper ends of the levers 31 are attached to a rock shaft 33 transversely journaled beneath the wagon box or body 13 by a frame 34. The upper end of the lever 28 is pivotally attached to an operating rod 35 extending forwardly beneath the wagon body and having an upturned forward end or goose-neck 36 freely extending through a slot 37 in the dash board 16 with the free end of the rod pivotally attached to the foot lever 24 as at 38. It will be understood that the driver positioned upon the seat 14 may readily apply the brakes 32 by imparting a forward impulse to the lever 24 by means of his foot. Oppositely positioned toothed jaws 39 are pivoted within the casing 17 as at 40 having connecting springs 41 and 42 adapted for resiliently engaging the toothed portions 43 of the inner faces of the said jaws against the connecting member 26 of the foot lever 24 whereby the said lever is maintained locked in its forward position with the brake set until the jaws 39 are released therefrom by the mechanism hereinafter set forth, a return spring 44' being attached between the rear end of the rod 35 and the wagon body, being arranged to return the brake mechanism to its normal position when so desired.

The teeth upon the jaws 39 are so inclined as to permit the connecting member 26 to move forwardly ratcheting thereover but preventing a rearward movement of the lever 24 until the jaws are released. Oppositely projecting releasing arms 44 are pivoted to the jaws 39 and to crank arms 45 of gears 46 journaled adjacent the opposite ends of the casing 17. Similar gears 47 are positioned inwardly of the gears 46 in constant mesh therewith, a foot lever 48 being provided upon the axle 49 of each of the said inner gears 47. A foot plate 50 is arranged upon the free end of each of the levers 48 having depending pins 51 slidably arranged in guide slots 52 in the top plate 18 of the casing, it being understood that the forward impulse imparted to either of the plates 50 revolves the gears 47 and 46, which by means of the cranks 45 and arms 44 taken with a connector 53 arranged between the arm 44 and a similar arm 54 of the oppositely-arranged inner gear 47 effects an outward releasing movement of the jaws 39 allowing the connecting member 26 to move rearwardly under the influence of the aforementioned spring 44'. A strong and efficient wagon brake is thereby arranged whereby the brakes are readily set from the driver's seat and locked in their set positions until released by either of the foot plates 50 conveniently arranged adjacent the opposite ends of the floor 15.

What I claim as new is:

1. A wagon brake construction comprising oppositely-positioned resiliently connected toothed jaws, brake setting means shiftably arranged between the said jaws longitudinally thereof in contact therewith, and retracting means for both of said jaws operable at points adjacent the opposite ends of the casing.

2. A brake device comprising in combination with a wagon, a casing arranged within the floor thereof adjacent the driver's seat, brake setting means slidably arranged transversely of the said casing having an operating lever centrally arranged thereabove, oppositely positioned jaws pivoted within said casing having toothed inner faces engaging the said setting means, resilient connections between the said jaws, oppositely-extending retracting arms for the said jaws having their inner ends pivoted to the latter, and lever members positioned adjacent the opposite ends of the casing operatively attached to the said arms whereby the said jaws are simultaneously retracted during the forward swinging movement of either of the said levers.

3. A brake device comprising in combination with a wagon, a casing arranged within the floor thereof adjacent the driver's seat, brake setting means slidably arranged transversely of the said casing having an operating lever centrally arranged thereabove, oppositely positioned jaws pivoted within said casing having toothed inner faces engaging the said setting means, resilient connections between the said jaws, oppositely-extending retracting arms for the said jaws having their inner ends pivoted to the latter, outwardly-positioned gears within the said casing, arms carried by the said gears pivotally attached to the outer ends of the said jaw arms, inwardly-positioned gears arranged between the said outer gears and jaws in constant mesh with the said outer gears, a crank arm carried by one of the said inner gears, pivotal connections between the said crank arm of the inner gear and the crank arm of the outwardly-positioned gear at the opposite end of the casing, and means for revolving one of the said gears whereby the said jaws are separated simultaneously.

4. A brake device comprising in combination with a wagon, a casing arranged within the floor thereof adjacent the driver's seat, brake setting means slidably arranged transversely of the said casing having an operating lever centrally arranged thereabove, oppositely positioned jaws pivoted within said casing having toothed inner faces engaging the said setting means, resilient connections between the said jaws, oppositely-extending retracting arms for the said jaws having their inner ends pivoted to the latter, outwardly-positioned gears within the said casing, arms carried by the said gears pivotally attached to the outer ends of the said jaw arms, inwardly-positioned gears arranged between the said outer gears and jaws in constant mesh with the said outer gears, a crank arm carried by one of the said inner gears, pivotal connections between the said crank arm of the inner gear and the crank arm of the outwardly-positioned gear at the opposite end of the casing, actuating levers operatively attached to the axles of the said inner gears and arranged above the said casing, foot plates upon the said actuating levers adjacent the opposite sides of the driver's seat, and guide levers for the said foot levers.

5. A device of the class described comprising in combination with a wagon, a brake operating rod longitudinally shiftably arranged beneath the wagon having its forward end slidably positioned through the forward dash-board thereof, a mechanism casing adjacent the driver's seat, a foot lever slidably carried by the said casing attached to the said rod, wheel engaging brake blocks suspended adjacent the rear wheels of the wagon, link fulcrums connections between the said blocks and the rear axle of the wagon pivotally attached to the rear end of the said rod, and a releasing spring for the brakes attached to the rear end of the said rod.

In testimony whereof I affix my signature.

PIOTR GIBA.

Copies of this patent may be obtained for five cents each, by addressing the "Commissioner of Patents, Washington, D. C."